(12) United States Patent
Vismara et al.

(10) Patent No.: US 6,648,383 B2
(45) Date of Patent: Nov. 18, 2003

(54) PROTECTIVE STRUCTURE FOR VEHICLES, DESIGNED TO BE USED, IN PARTICULAR, IN THE EVENT OF IMPACT WITH PEDESTRIANS

(75) Inventors: Mario Vismara, Lecco (IT); Jean Louis Toneatti, Milan (IT)

(73) Assignee: Adlev S.r.l., Monza-Milan (IT)

( * ) Notice: Subject to any disclaimer, the term of this patent is extended or adjusted under 35 U.S.C. 154(b) by 0 days.

(21) Appl. No.: 10/080,908

(22) Filed: Feb. 21, 2002

(65) Prior Publication Data

US 2002/0180223 A1 Dec. 5, 2002

(30) Foreign Application Priority Data

Jun. 1, 2001 (IT) ..................... MI2001A1170

(51) Int. Cl.⁷ .............................................. B60R 19/03
(52) U.S. Cl. ...................... 293/120; 293/133; 293/122
(58) Field of Search ................................ 293/120, 133, 293/110, 121, 122, 107, 155; 180/274

(56) References Cited

U.S. PATENT DOCUMENTS

| | | | | |
|---|---|---|---|---|
| 3,897,095 A | * | 7/1975 | Glance et al. | 293/120 |
| 4,190,276 A | * | 2/1980 | Hirano et al. | 293/133 |
| 4,457,547 A | * | 7/1984 | Sekiyama et al. | 293/110 |
| 4,460,206 A | * | 7/1984 | Peter | 293/120 |
| 4,474,395 A | * | 10/1984 | Harloff et al. | 293/120 |
| 4,482,180 A | * | 11/1984 | Huber et al. | 293/120 |
| 4,762,352 A | * | 8/1988 | Enomoto | 293/120 |
| 4,826,226 A | * | 5/1989 | Klie et al. | 293/120 |
| 4,974,891 A | * | 12/1990 | Furuta | 293/120 |
| 5,056,840 A | * | 10/1991 | Eipper et al. | 293/120 |
| 5,078,439 A | * | 1/1992 | Terada et al. | 293/121 |
| 5,080,411 A | * | 1/1992 | Stewart et al. | 293/122 |
| 5,106,137 A | * | 4/1992 | Curtis | 293/107 |
| 5,123,688 A | * | 6/1992 | Takado et al. | 293/120 |
| 5,154,462 A | * | 10/1992 | Carpenter | 293/120 |
| 5,201,912 A | * | 4/1993 | Terada et al. | 293/120 |
| 5,290,078 A | * | 3/1994 | Bayer et al. | 293/120 |
| 5,385,375 A | * | 1/1995 | Morgan et al. | 293/122 |
| 5,404,974 A | * | 4/1995 | Thum et al. | 293/122 |
| 5,441,319 A | * | 8/1995 | Oyama et al. | 293/155 |
| 5,803,517 A | * | 9/1998 | Shibuya | 293/120 |
| 6,003,912 A | * | 12/1999 | Schonhoff et al. | 293/122 |
| 6,082,792 A | * | 7/2000 | Evans et al. | 293/120 |
| 6,099,055 A | * | 8/2000 | Hirota et al. | 293/120 |
| 6,179,355 B1 | * | 1/2001 | Chou et al. | 293/120 |
| 6,182,782 B1 | * | 2/2001 | Matsuura et al. | 180/274 |
| 6,199,937 B1 | * | 3/2001 | Zetouna et al. | 293/136 |
| 6,209,934 B1 | * | 4/2001 | Sakuma et al. | 293/120 |
| 6,227,582 B1 | * | 5/2001 | Ichien | 293/132 |
| 6,231,094 B1 | * | 5/2001 | Uytterhaeghe et al. | 293/120 |
| 6,325,431 B1 | * | 12/2001 | Ito | 293/102 |
| 6,364,384 B1 | * | 4/2002 | Kemp et al. | 293/120 |
| 6,398,275 B1 | * | 6/2002 | Hartel et al. | 293/120 |
| 6,406,081 B1 | * | 6/2002 | Mahfet et al. | 293/120 |
| 6,428,065 B2 | * | 8/2002 | Sato et al. | 293/120 |
| 6,460,909 B2 | * | 10/2002 | Mansoor et al. | 293/120 |
| 6,467,821 B2 | * | 10/2002 | Hirota | 293/120 |
| 2001/0030432 A1 | * | 10/2001 | Mansoor et al. | 293/120 |
| 2002/0101085 A1 | * | 8/2002 | Gehringhoff et al. | 293/120 |

FOREIGN PATENT DOCUMENTS

| | | | |
|---|---|---|---|
| JP | 55-102745 | * | 8/1980 |
| JP | 3-224849 | * | 10/1991 |
| JP | 5-32143 | * | 2/1993 |

* cited by examiner

*Primary Examiner*—Kiran Patel
(74) *Attorney, Agent, or Firm*—Hedman & Costigan, P.C.

(57) ABSTRACT

A protective structure for vehicles (10), designed to be used, in particular, in the event of impact between a vehicle (10) and a pedestrian (so-called pedestrian impact), in which at least one energy absorption element or buffer (16) is used, positioned, at least partially, parallel to the front cross member (17) of the vehicle (10); it is furthermore possible to modify the external style (L) of the vehicle (10), by bringing the profile of the bonnet (11) forward and/or furthermore providing for the insertion of a new buffer (25), designed to work on the front-end structure of the vehicle (10), positioned below the bumper (12), in order to obtain advantages in terms of safety.

5 Claims, 13 Drawing Sheets

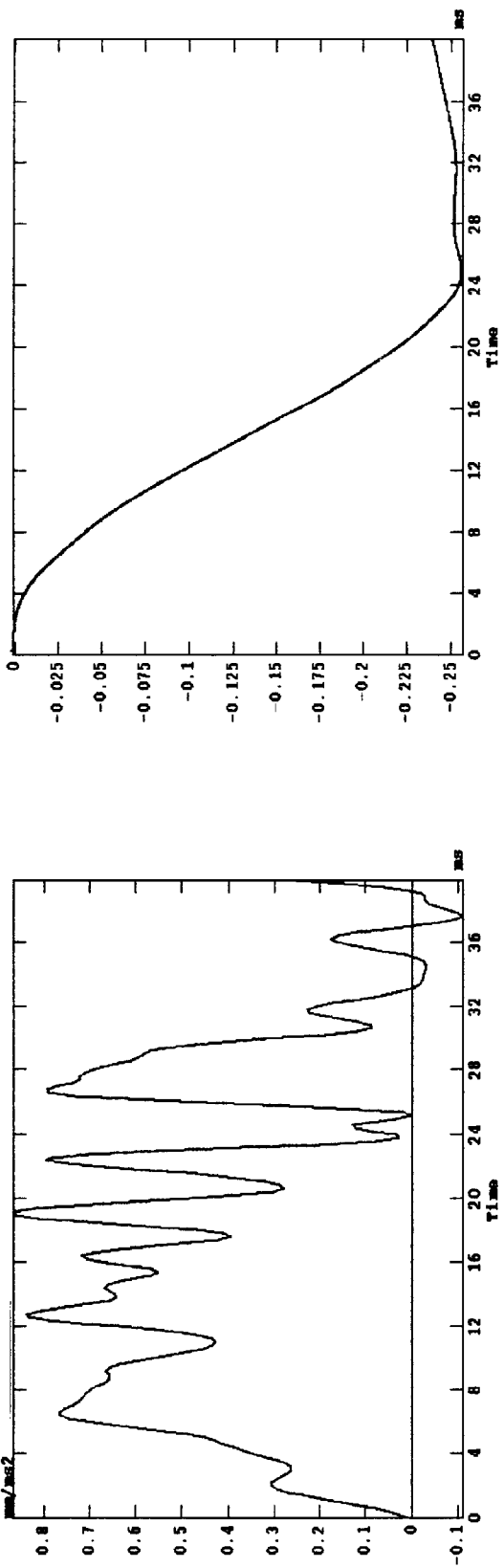

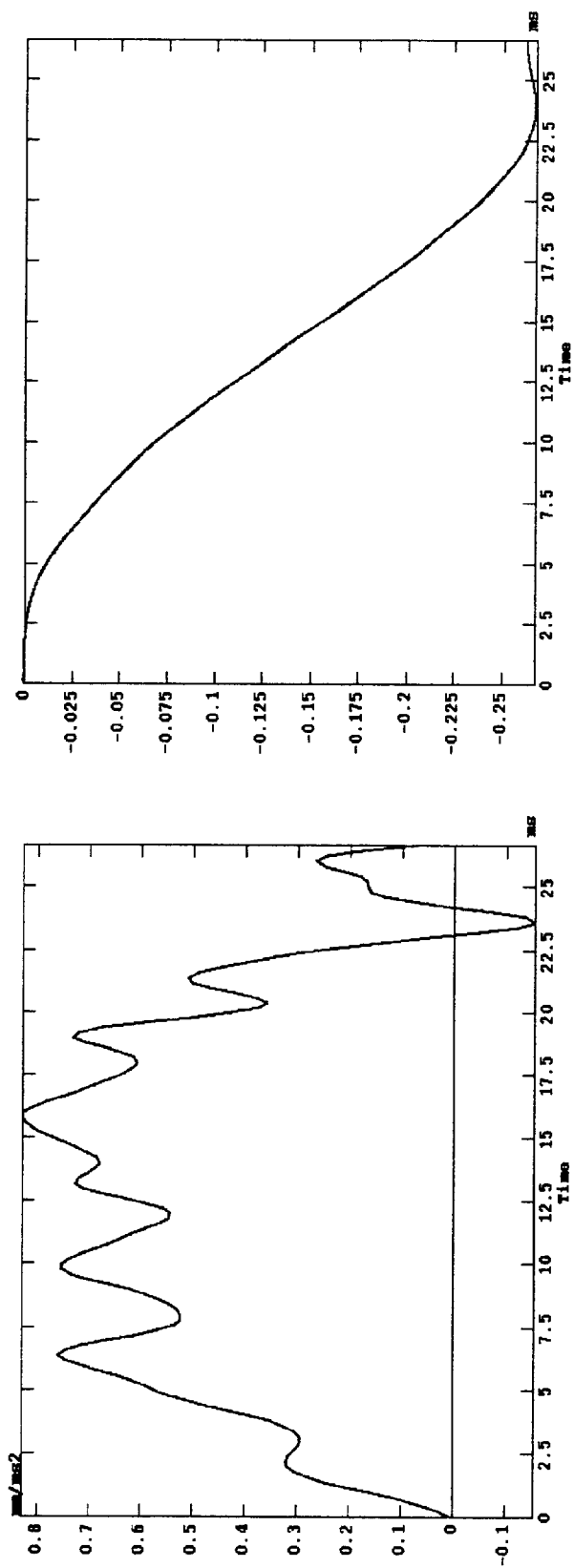

PROTECTIVE STRUCTURE FOR VEHICLES, DESIGNED TO BE USED, IN PARTICULAR, IN THE EVENT OF IMPACT WITH PEDESTRIANS

The present invention concerns a protective structure for vehicles designed to be used, in particular, in the event of impact with pedestrians.

The recent legislative proposals concerning impact in the automotive field provide for increasingly stringent limits in particular as regards impact occurring between vehicles and pedestrians (so-called pedestrian impact).

In this regard numerous absorption systems have been studied for the purpose of observing said limits without affecting performance on other types of impact.

In particular, the conditions proposed by the current regulations provide for maximum leg rotation in the event of impact to be less than or equal to 15° at average-low vehicle speed (approximately 40 km/h), while maximum displacement between femur and tibia must be less than or equal to 6 mm; a further maximum limit is established (less than or equal to 150 g where g represents the acceleration of gravity, equal to approximately 9.81 m/s$^2$) in relation to acceleration values corresponding to the tibia.

The test measurements performed, on the basis of the data relating to the mean weight of a femur and a tibia and at the speed of a vehicle during impact, result in a final energy balance in which, according to the style of the vehicle bodywork, the end of the impact is ideally determined when the initial energy of the leg is converted into work due to the movements of the same (shearing force work, work due to the rotation moment and deformation work due to crushing of the absorption devices).

From this, and from the limits on the rotation and shearing movements established by the regulations, it derives that 90% of the energy is absorbed by the deformation work and, for this reason, it is necessary to use inside the bumper strip of the vehicle at least one energy absorption device or buffer sized so that the crushed portion is equal to at least 70 mm (taking account of the average shape of the vehicles currently produced).

It should be noted that in the case of a flat vehicle front (although so far a shape of this type has never been designed) the length of the buffer would have to be such as to ensure a crushed portion equal to at least 35 mm; this clearly leads to the consideration that one of the fundamental variables in the design of absorption systems complying with the limitations established by the regulations, in the event of pedestrian impact, is the shape of the vehicle which, however, is sometimes difficult to modify due to aesthetic and marketing factors.

Furthermore, using absorption systems of known types, finite element analysis shows that with buffers of different densities, the maximum impact acceleration and the maximum rotation angle of the leg increase with the compactness and hardness of the absorption device; also in this case, therefore, the limits established by the regulations are substantially exceeded.

Another important factor to be taken into consideration is that ideal absorption devices do not exist in nature, i.e. such that a given force is constant throughout the entire buffer crushing range.

On the contrary, the existing absorbers (normally made of foamed polypropylene or polyurethane foam or extruded polypropylene foam, such as strand foam®) do not perform constantly over the entire crushing range.

The test measurements relating to a pedestrian impact simulation performed with traditional type absorber devices (consisting of a buffer fitted between bumper strip and forced to work on a resistant cross member) have shown that said devices cannot satisfy the requirements unless the structure has considerable overall dimensions, with respect to a possible minimum theoretical value of approximately 70 mm.

Further tests were performed both in normal conditions with the bumper brought forward in the direction of the impact point by approximately 100 mm; also in these cases, however, the maximum values relating to impact acceleration, rotation corresponding to the knee and maximum shearing, although slightly different, were well above the required limits.

It is therefore evident that the increase in the market demand for attractively designed good-looking motor vehicles conflicts with considerations relating to the safety of pedestrians who, in the event of impact with vehicles travelling at average-low speeds, must be safeguarded, with a reasonable hope of avoiding serious or even permanent injury.

On the other hand, if the absorber devices were arranged longitudinally between bumper and cross member, the thickness of the buffer would have to be increased out of all proportion with respect to the rules of style for vehicle profiles and at the expense of the weight, overall costs of the structure and overall performance of the vehicle, in order to satisfy safety requirements, both in the case of impact with bulky heavy obstacles (road signs, other vehicles etc.) and in the case of collision with pedestrians.

The aim of the present invention is therefore to eliminate the above disadvantages, producing a highly efficient protective structure for vehicles, designed to be used particularly in the event of impact with pedestrians which, first and foremost, meets the requirements of the current regulations concerning collision of a vehicle with a pedestrian at average-low speed, without modifying the shape, the style and the performance of the vehicle on other types of impact.

A further aim of the invention is to produce a protective structure for vehicles, designed to be used in particular in the event of impact with pedestrians, which is able to considerably increase the force on the leg of the pedestrian without increasing the rotation produced, at the same time featuring compact dimensions of the energy absorber devices used.

These and other aims, according to the present invention, are achieved by producing a protective structure for vehicles, designed to be used particularly in the event of impact with pedestrians, according to claim 1, here referred to for the sake of brevity.

Advantageously, the structure subject of the present invention has more limited overall dimensions and is considerably cheaper and more effective in terms of performance than the known structures.

In particular, by using the absorption structure according to the present invention, the force on the leg of the pedestrian can be increased without increasing the rotation force on the knee.

The characteristics and advantages of a protective structure for vehicles, designed to be used particularly in the event of impact with pedestrians, according to the present invention, will become clearer from the following non-restrictive description referring to the attached schematic drawings in which:

FIGS. 8A, 8B and 8C show a series of graphs relating to respective time trends of acceleration on the tibia, rotation corresponding to the knee and displacement due to shearing force measured during a collision between a pedestrian and a vehicle provided with the protective structure of FIG. 7, corresponding to the transverse portion identified in FIG. 7A;

FIGS. 9A, 9B and 9C show a series of graphs relating to respective time trends of acceleration on the tibia, rotation corresponding to the knee and displacement due to shearing force measured during a collision between a pedestrian and a vehicle provided with the protective structure of FIG. 7, corresponding to the transverse portion identified in FIG. 7B;

Figure 1:
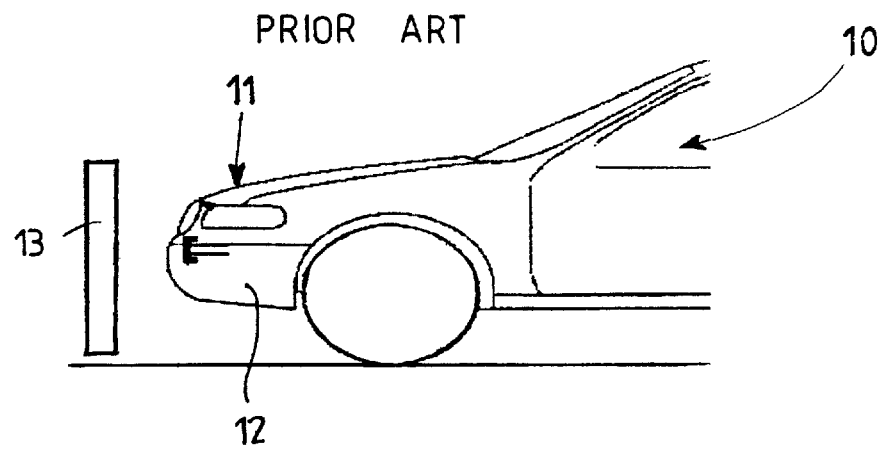
FIG. 1 is an illustrative schematic side view of the physical and geometric conditions of a pedestrian collision.
Figure 2:
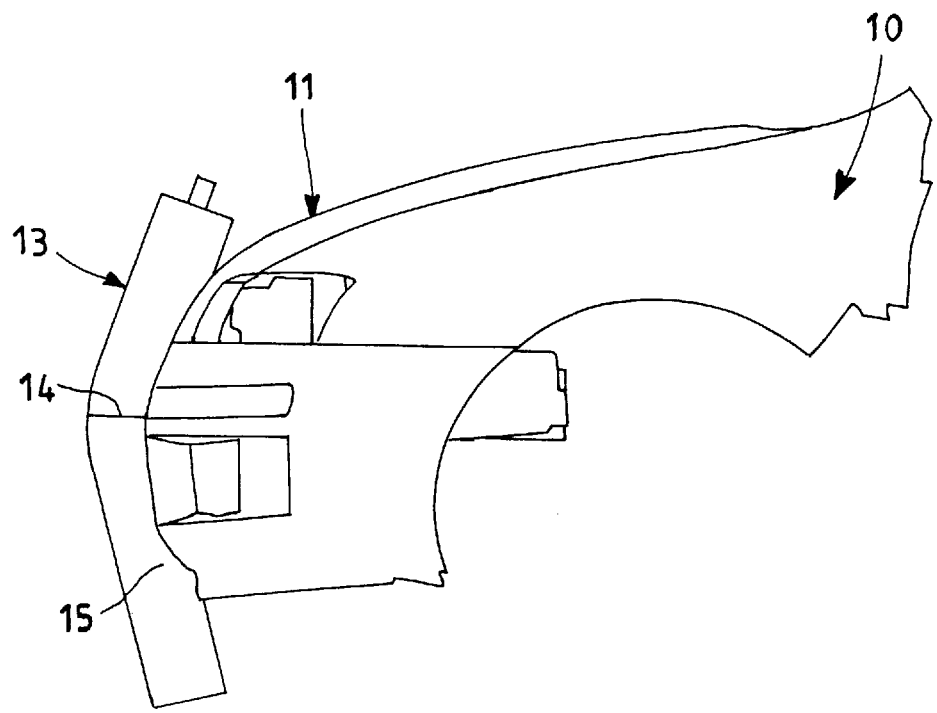
FIG. 2 is an illustrative side view of a collision, reproduced in the laboratory (in order to measure the relevant parameters), between a pedestrian and a vehicle provided with traditional impact energy absorption structures.

In particular, FIGS. 1, 2 and 3A–3C, 4A–4C refer to structures of the frontal portion of the bonnet 11 of vehicles, indicated generally by number 10, of known type and having a traditional bumper strip 12, about to collide with a dummy leg 13, made in the laboratory and able to behave in the same way as a human leg; in this regard, the test measurements relating to pedestrian collision are performed on said element 13, which moreover, during the impact, behaves like a human limb (see, for example, FIG. 2 which gives an example of collision involving limb shearing and rotation forces, corresponding substantially to the knee joint 14, and acceleration corresponding to the tibia, portion indicated by 15 in FIG. 2).

Figure 3A:
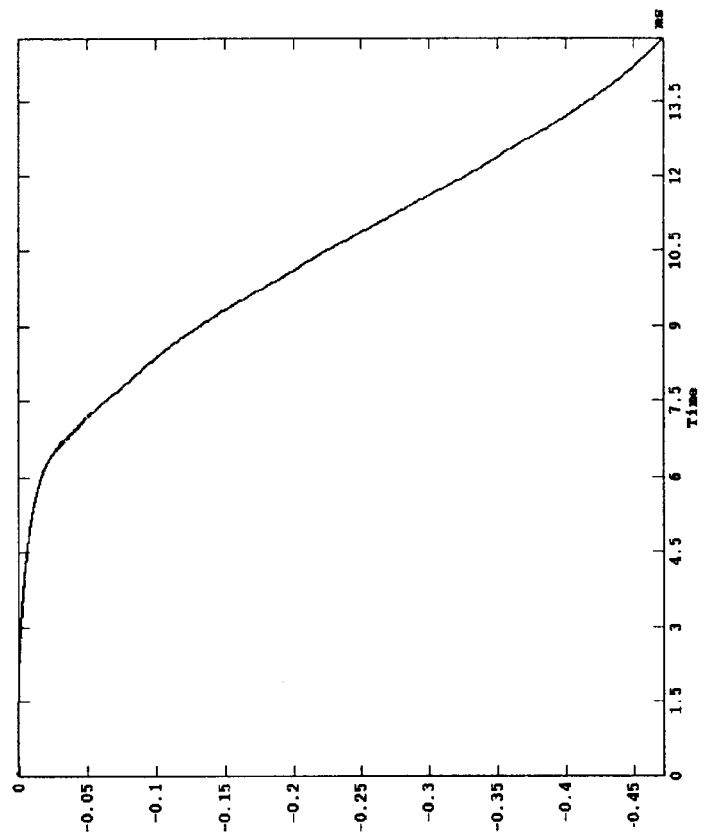
FIGS. 3A, 3B and 3C show a series of graphs relating to respective time trends of acceleration on the tibia, rotation corresponding to the knee and displacement due to shearing force measured during impact between a pedestrian and a vehicle provided with traditional impact energy absorption structures.
Figure 3B:
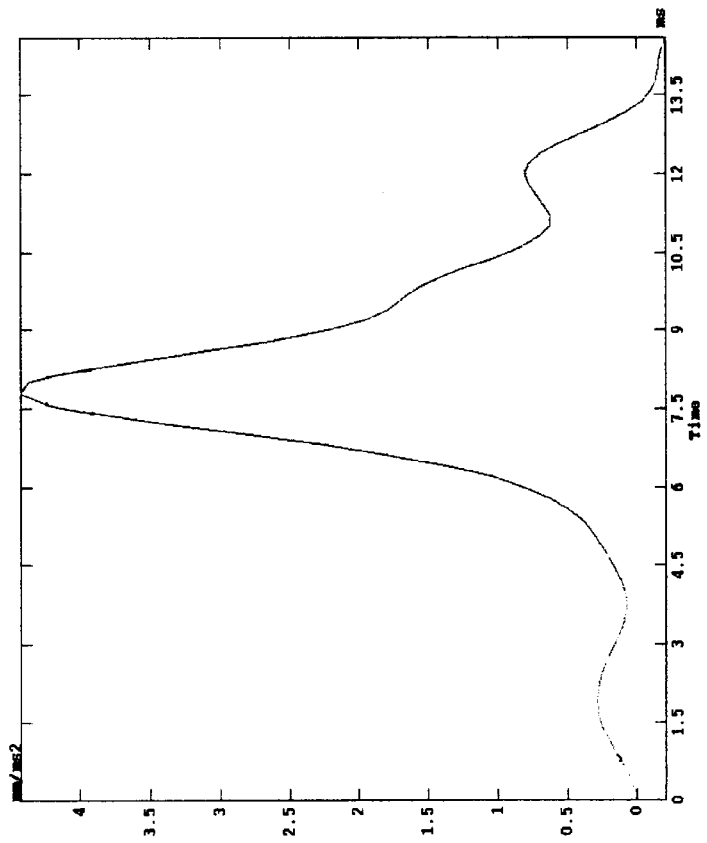
Figure 3C:
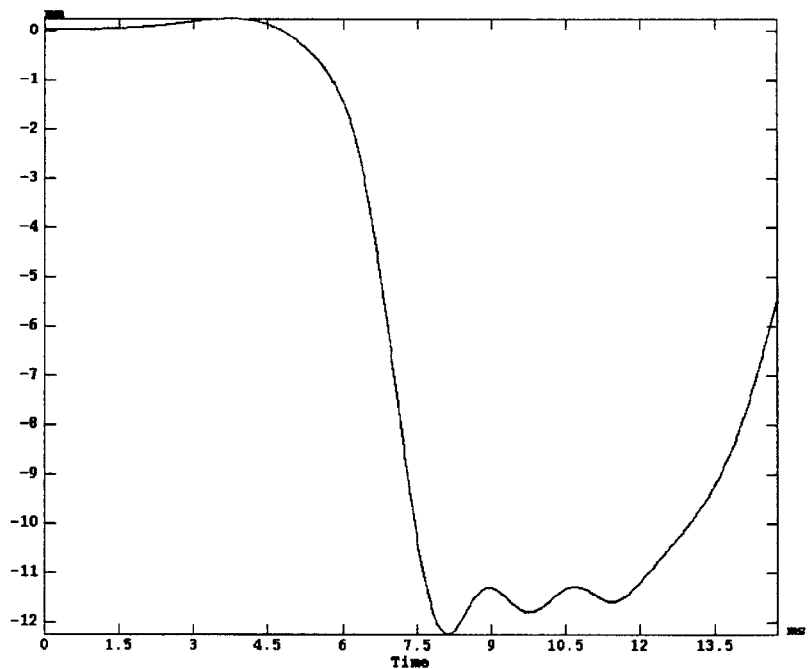

The graphs illustrated in FIGS. 3A–3C show the complete inefficiency of the traditional types of pedestrian impact absorption systems; it can be noted, in fact, that during collision maximum acceleration (FIG. 3A) equal to approximately 448.5 g (m/s$^2$) is discharged onto the tibia while maximum angular rotation corresponding to the knee joint 14 is equal to approximately 26.7° (FIG. 3B).

Furthermore, at the collision point, the shearing force causes a maximum displacement of approximately 12.3 mm in a direction perpendicular to the development of the bumper strip 12.

The above-mentioned values, obtained experimentally by recreating in the laboratory the dynamic conditions of a pedestrian collision, are clearly totally unacceptable, with regard to the limits established by the proposed legislation, for the purposes of preventing particularly serious traumas to the lower limbs of a pedestrian during a collision at average-low speed.

In fact, as recalled previously, said reference values must satisfy much more stringent limits: for example, maximum acceleration on the tibia must be equal to or less than 150 g (m/s$^2$), maximum rotation must be less than or equal to 15°, while maximum displacement of the knee joint due to the shearing force must be less than or equal to 6 mm.

Figure 4C:
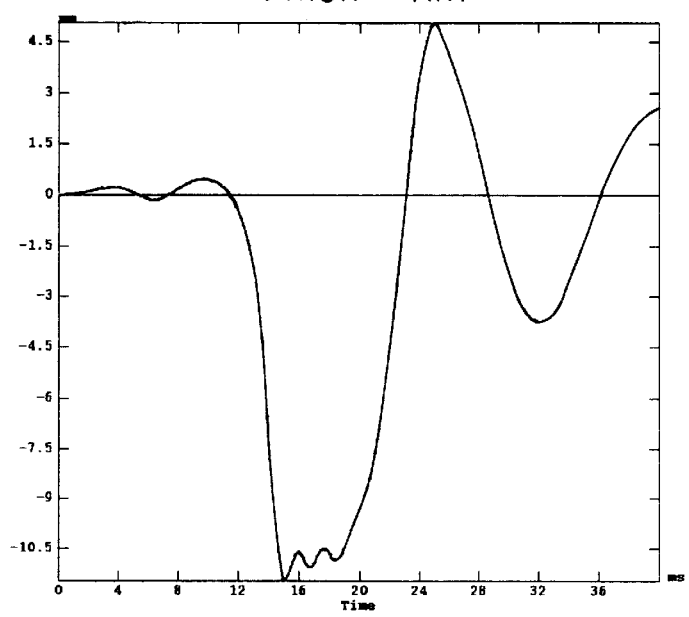
FIGS. 4A, 4B and 4C show a series of graphs relating to respective time trends of acceleration on the tibia, rotation corresponding to the knee and displacement due to shearing force measured during impact between a pedestrian and a vehicle provided with traditional impact energy absorption structures and having a bumper strip 100 mm farther forward with respect to the vehicle in FIGS. 3A–3C.
Figure 4A:
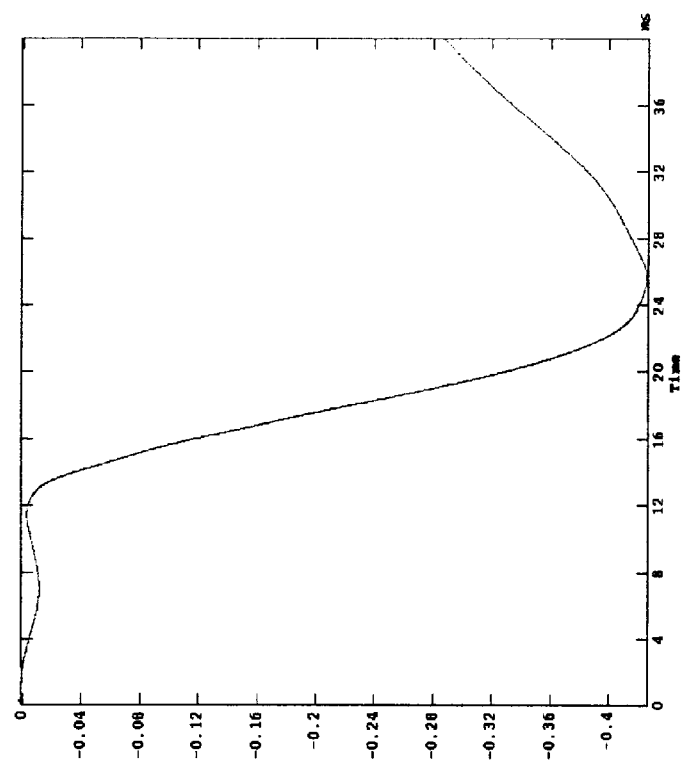
Figure 4B:
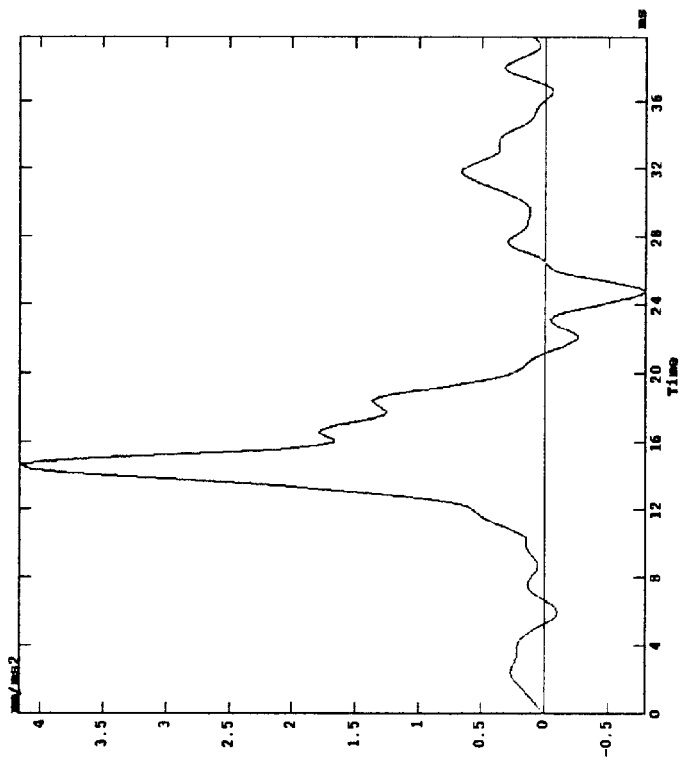

The graphs shown in FIGS. 4A–4C refer to a series of tests performed in the laboratory, using the same vehicle 10 and the same sample 13 for the simulation and adopting the same geometric and dynamic conditions as previously, but bringing the profile 11 of the anterior portion of the vehicle bonnet 10 forward by 100 mm.

This was done in the knowledge that it was possible to considerably improve the previous results while at the same time recognising a loss in terms of overall weight and total dimensions of the structure of the vehicle 10, and generally in terms of appearance and look of the vehicle according to the aesthetic criteria currently adopted.

Simply bringing the profile of the bonnet 11 of the vehicle 10 forward, however, does not give the results hoped for; said consideration is clearly demonstrated by comparing the graphs relating to FIGS. 4A–4C, showing maximum acceleration (FIG. 4A) of approximately 417.9 g (m/s$^2$), angular rotation of approximately 24.34° (FIG. 4B) and a shearing force, producing a transverse displacement with respect to the bumper strip 12, of approximately 11 mm (FIG. 4C).

The underlying idea of the present invention is to avoid inserting after the front cross member of the vehicle 10 one or more absorption devices, positioned inside the bumper strip 12, according to the known technique, but to exploit the bumper strip 12 to house at least one absorption device or buffer (indicated by 16 in FIG. 5), having traditional type physical impact energy absorption characteristics, connected in parallel with the shaped front cross member of the vehicle 10.

Figure 5:
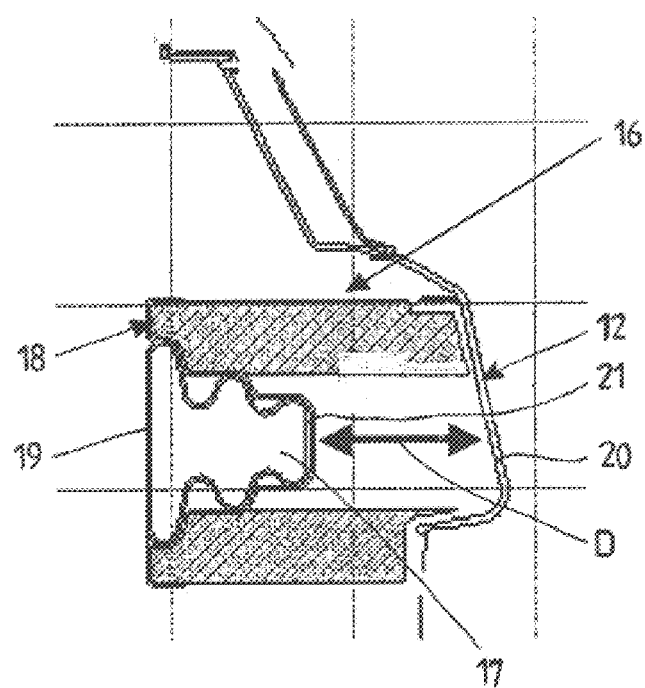
FIG. 5 shows a partial cutaway and partial section view of a first form of preferred embodiment of a protective structure for vehicles designed to be used, in particular, in the event of impact with pedestrians, according to the invention.

In particular, the above-mentioned condition of parallelism entails projection of the outer edge 21 of the cross member 17 forward with respect to the internal supporting surface of the buffer 16, which means that the total thickness of the buffer must be at least 20% greater than the distance between the outer edge 21 of the cross member and the outer edge 20 of the bumper (distance indicated by D in FIG. 5).

It should be pointed out that, in the present form of embodiment of the invention, shown as a nonrestrictive example, in the illustration of FIG. 5, a shaped cross member 17 of known type is used, i.e. one of the front cross members currently used and fitted in the majority of medium range vehicles.

According to the invention, the buffer 16 can be connected to the cross member 17 by means of a shaped support 18; alternatively, the cross member 17 itself, appropriately shaped, can act as a support.

In the case of FIG. 5, with cross member 17 shaped in the form of a concertina, for the purpose of obtaining impact resistance values comparable with the specifications established by the current regulations, the cross member 17 is retracted inside the structure of the vehicle so that its outer edge 21 has a distance D from the outer edge 20 of the bumper strip 12.

Said distance D (equal to at least 80 mm) must be assessed on the section of least distance between cross member 17 and bumper 12, in order to guarantee adequate performance at all possible impact points.

In this case, both the external profile of the bonnet 11 of the vehicle 10 and the profile of the front cross member 17 are those currently used for vehicles of the type considered.

Furthermore, the buffer 16 is made of materials with characteristics such as to obtain pressures of 0.1–0.6 N/mm$^2$ with crushing equal to 50%.

Figure 6C:
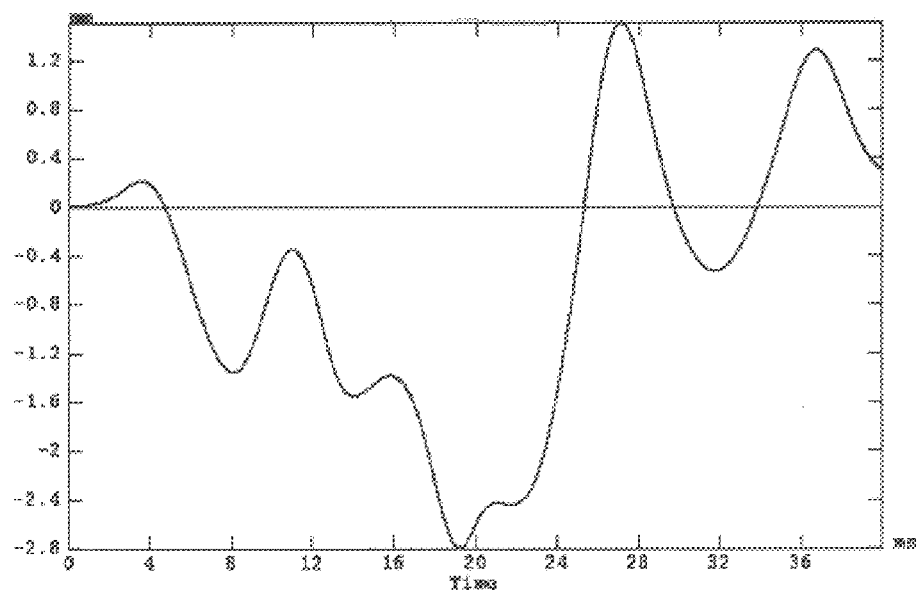
FIGS. 6A, 6B and 6C show a series of graphs relating to respective time trends of acceleration on the tibia, rotation corresponding to the knee and displacement due to shearing force measured during a collision between a pedestrian and a vehicle provided with the protective structure of FIG. 5.
Figure 6B:
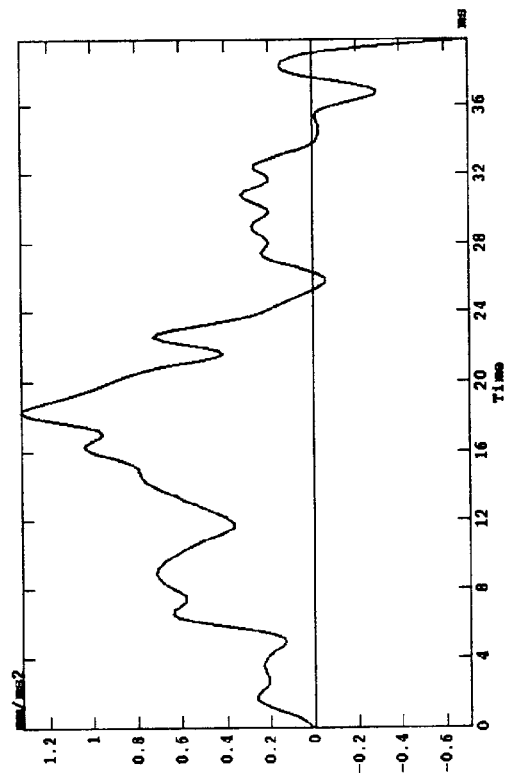
Figure 6A:
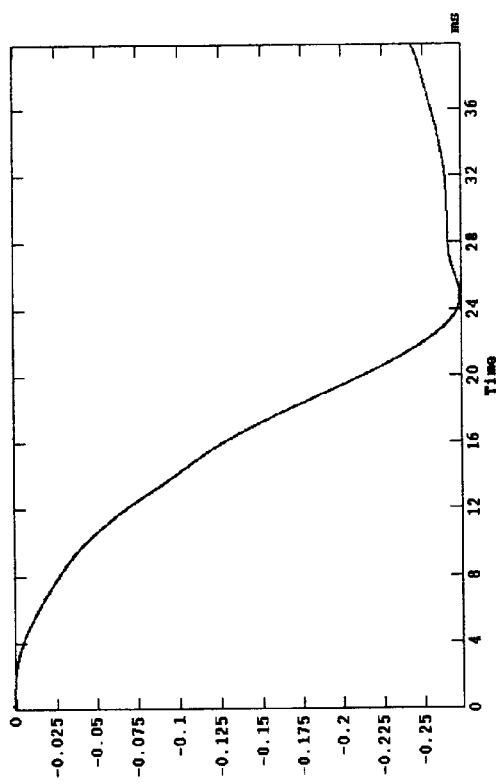

The graphs shown in FIGS. 6A–6C give the test results obtained by using an impact energy absorption structure (in this specific case pedestrian impact) like the one just described, according to the invention.

It is evident that the values obtained already fall within the permitted range; in fact, more in particular, the maximum impact acceleration (FIG. 6A) is equal to approximately 134 g (m/s$^2$), maximum angular rotation corresponding to the knee joint 15 is equal to 15° (see FIG. 6B) and the maximum shearing force causes maximum displacement tangential to the point of impact of approximately 2.80 mm (see FIG. 6C).

As can be clearly seen in FIG. 5, in this first example of embodiment of the absorption structure for vehicles according to the invention, the buffer 16 has not been placed directly on the front cross member 17 in order to avoid excessive densification of the buffer 16 itself which would entail, according to a finite element mathematical model, a further increase in the space necessary between cross member 17 and outer edge 20 (the distance indicated by D in FIG. 5) from 80 mm (case discussed previously) to approximately 120 mm.

Figure 7:
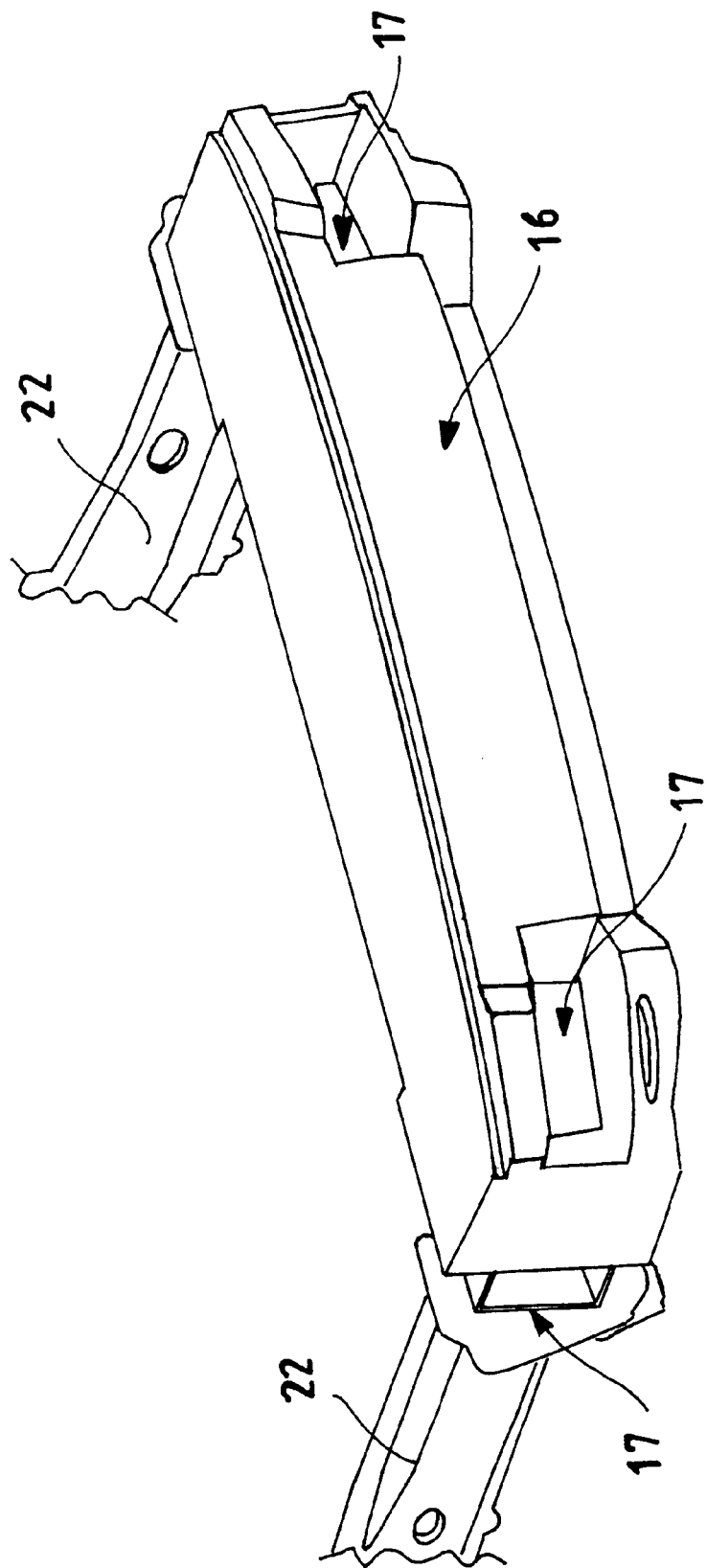
FIG. 7 is a perspective view of a second non-restrictive form of embodiment of the protective structure for vehicles designed to be used, in particular, in the event of collision with pedestrians, according to the present invention.

As shown in FIG. 7, the embodiment of FIG. 5 can be used only on suitable portions of the absorber device 16 of the vehicle 10 and, in particular, where necessary due to problems of compactness of the structure.

Figure 7A:
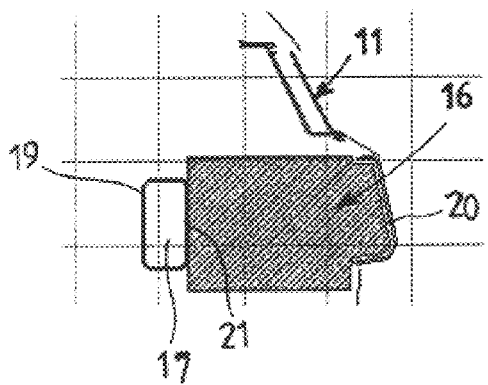
FIG. 7A is a first cross-section view of the protective structure of FIG. 7.
Figure 7B:
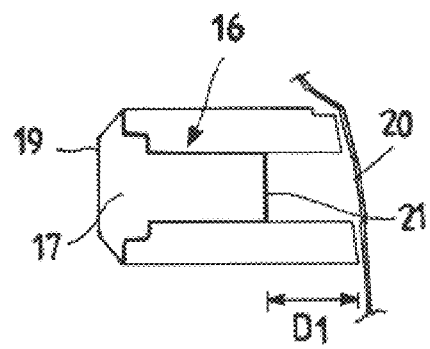
FIG. 7B is a second cross-section view of the protective structure of FIG. 7.

The structural constitution of said absorption system can be clearly seen in FIGS. 7A and 7B which represent two transverse sections of the structure, taken respectively in the centre of the bumper strip 12 and corresponding to the parts of the absorption device 16 produced as illustrated in FIG. 5; in particular, in FIG. 7B, the parallel arrangement of one or more buffers 16, with respect to the cross member 17, corresponding to each side member 22 of the vehicle 10, permits retraction of the above-mentioned cross member 17 with respect to the outer edge 20 of the bumper strip 12, by a distance of 80 mm (indicated by D1 in FIG. 7B).

Figure 8C:
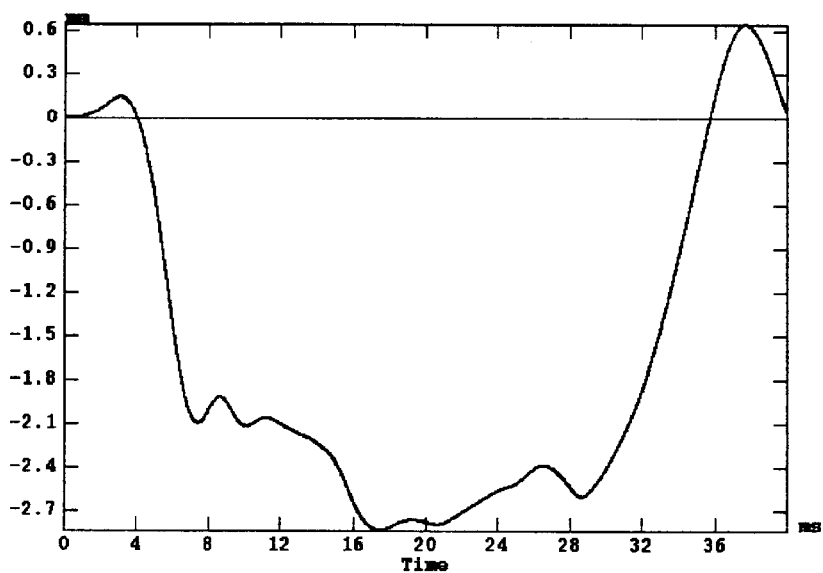
Figure 9C:
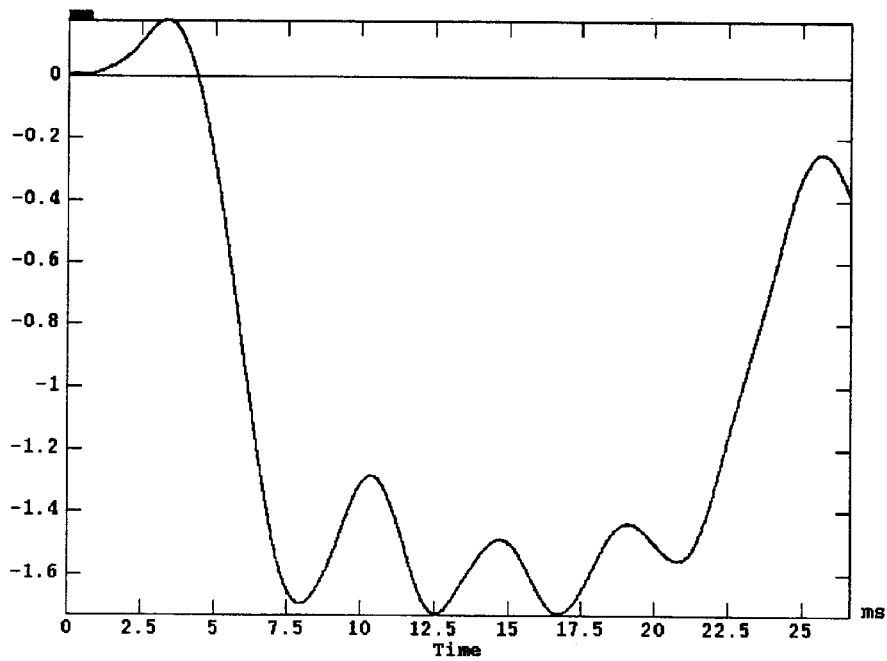

The graphs shown in the FIGS. 8A–8C (relating to a pedestrian collision corresponding to the transverse section of the absorption structure illustrated in FIG. 7A) and in FIGS. 9A–9C (relating to a pedestrian collision corresponding to the transverse section of the absorption structure illustrated in FIG. 7B) highlight the further reduction in acceleration and tangential shearing values during a pedestrian collision.

FIG. 8A shows a maximum acceleration, in time, during impact with the tibia of the pedestrian, of 88 g (m/s$^2$), FIG. 8B shows maximum rotation values corresponding to the knee joint of approximately 14.60° and FIG. 8C shows a maximum tangential displacement due to the shearing force of approximately 2.80 mm.

FIG. 9A shows a maximum acceleration of 86 g (m/s$^2$) while FIG. 9B shows a maximum rotation of approximately 15° and FIG. 9C highlights a maximum shearing displacement of 1.75 mm.

It has therefore been experimentally demonstrated so far that, in conditions in which the outer profile of the vehicle 10, especially corresponding to the bonnet 11, is not modified with respect to the styles currently adopted, the solution involving the installation of at least one impact energy absorption buffer positioned, at least partially, parallel to the front cross member of the vehicle provides excellent results in terms of sensitive parameters, in the event of pedestrian impact, and in particular fully complies with the limitations established by the specific regulation proposed, at the same time achieving an optimal compromise with respect to the overall length of the vehicle (in fact it has been ascertained that retraction of the front cross member with respect to the outer edge of the bumper strip is equal to approximately 80 mm).

Lastly, it should be remembered that further improvements relating to maximum impact acceleration and rotation corresponding to the joints of the lower limbs of a pedestrian can be achieved by modifying the external style of the vehicle 10 and, in particular, bringing the front profile of the vehicle forward at the level of the bonnet 11.

Experimental results obtained by means of laboratory tests have confirmed that bringing forward the external profile of the vehicle 10 at the level of the bonnet 11 (profile indicated by broken line L in FIG. 10) permits, using a traditional type front cross member 17, retraction of the entire absorbing structure by only 55 mm with respect to the 80 mm (distance indicated by D in FIG. 5) from the outer edge 20 of the bumper strip 12.

Figure 10:
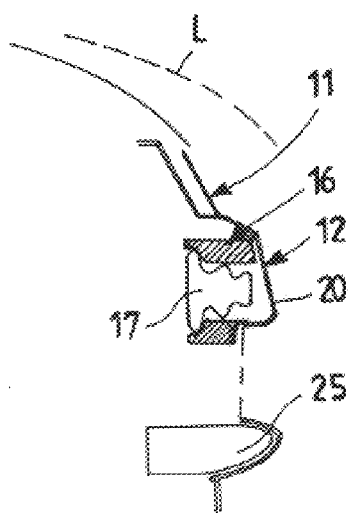
FIG. 10 shows a schematic side view, partially cutaway and partially in section, of an anterior frontal portion of a vehicle shaped according to a further non-restrictive form of embodiment of a protective structure for vehicles designed to be used particularly in the event of collision with pedestrians, according to the present invention.

Finally, further improvements in terms of test results were obtained by inserting at least one absorption device or buffer, indicated by 25 in FIG. 10, resting on the front-end structure of the vehicle (if necessary appropriately reinforced), i.e. in the area where the vehicle radiator is fitted.

In any case, bringing the vehicle profile forward to the level of the bonnet 11 and inserting the additional buffer 25 provides further advantages in terms of reduction of knee joint rotation.

Figure 11A:
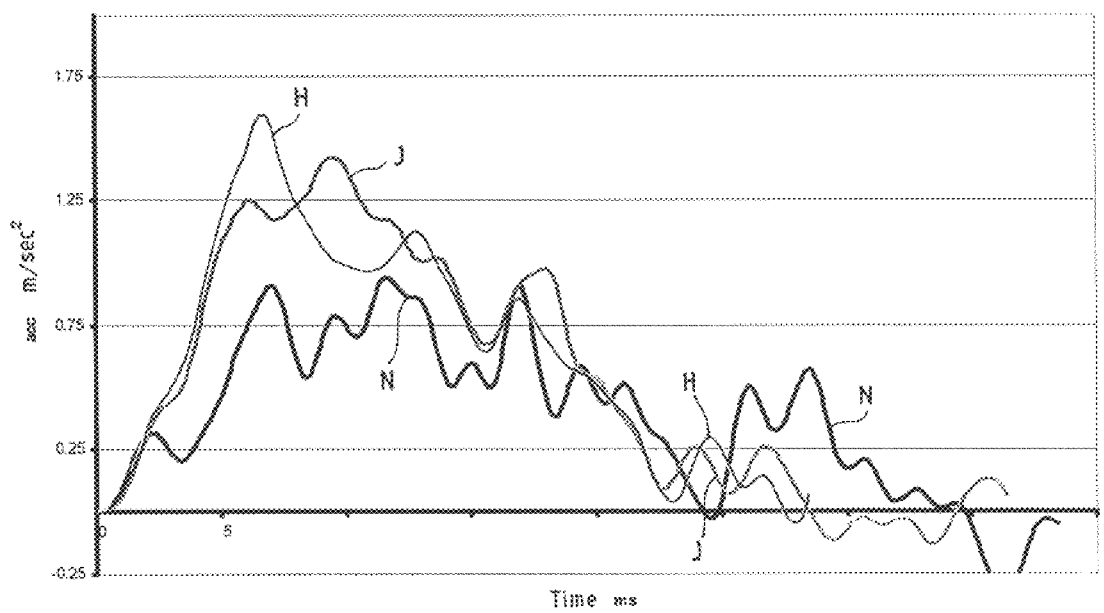
FIGS. 11A and 11B show a series of graphs relating to respective time trends of acceleration on the tibia and rotation corresponding to the knee joint of the pedestrian during a collision with a vehicle having different external profiles of the anterior frontal portion of the bonnet.
Figure 11B:
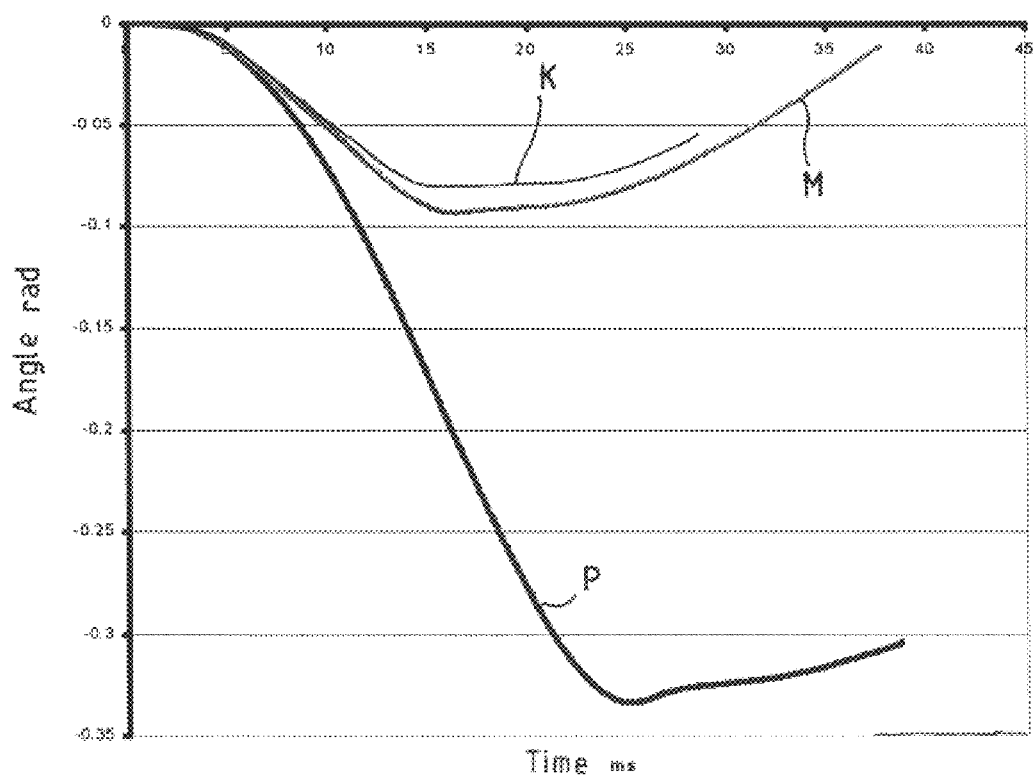

The graphs shown in FIGS. 11A, 11B highlight the advantages obtained in relation to the maximum rotation corresponding to the knee joint (curve K for a bonnet profile flush with the bumper strip and curve M for a bonnet profile 2 cm from the bumper strip (FIG. 11B)), with respect to the current external style of the front profile of the bonnet (curves N and P respectively of FIG. 11A and FIG. 11B); said advantage relating to the rotation consequently determines an increase in maximum acceleration on the tibia of the pedestrian (curve H for a bonnet profile flush with the bumper strip and curve J for a bonnet profile 2 cm from the bumper strip (FIG. 11A)) which, however, falls within the permitted limits.

The insertion of a buffer 25 corresponding to the front-end of the vehicle, with the vehicle in a traditional style, furthermore fully complies with the limitations of the current regulations, achieving an advantageous compromise with the overall length dimensions of the vehicle; in fact, the laboratory tests performed in said conditions gave as final results a maximum acceleration during the impact of 101 g (m/s²), a maximum rotation of approximately 15° and a maximum displacement due to the shearing force of approximately 3 mm, values which are extremely positive in view of the required specifications.

From the description provided, the characteristics of the protective structure for vehicles, designed to be used in particular in the event of impact with pedestrians, according to the present invention, are clear as are the resulting advantages.

In particular they are represented by:

possibility of designing systems (consisting of elastic buffer, plastic buffer and cross member) valid for many different vehicle versions, in relation to the shape of their bodywork, their weights and the regulations concerning impact with which they are required to comply, always achieving excellent results in terms of resistance to collision;

easy to simultaneously satisfy the various regulations concerning impact at various speeds;

high absorption capacity in the event of pedestrian impact, at average-low speeds, for any impact direction;

limited weight and overall dimensions of the entire absorption structure;

limited costs owing to the advantages achieved.

Finally, it is clear that further modifications and variations can be made to the protective structure for vehicles in question, all falling within the context of the inventive idea, as it is also clear that the materials and dimensions illustrated can be varied according to technical requirements.

What is claimed is:

1. Protective structure for vehicles (10) for the absorption of energy in a collision between a vehicle (10) and a pedestrian said vehicle (10) having two side members (22), said protective structure comprising at least one bumper strip (12), positioned to protect at least one shaped cross member (17) which connected to said two side members (22) of said vehicle (10), at least one first impact energy absorption buffer (16) housed inside said bumper strip (12) and said impact energy absorption device or buffer being connected, at least partially, parallel to said shaped cross member (17) of said vehicle (10) by means of at least one shaped support (18) which extends from at least one internal edge (19) of said cross member (17) to at least an external edge (20) of said bumper strip (12).

2. Protective structure for vehicles (10) as defined in claim 1, wherein at least one external edge (21) of said cross member (17) is at least 80 mm (D) from said external edge (20) of said bumper strip (12).

3. Protective structure for vehicles (10) as defined in claim 1, wherein said first impact buffer (16) is not positioned directly on the cross member (17) in order to avoid excessive densification which would cause an increase in the space necessary between said cross member (17) and at least one external edge (20) of said bumper strip (12).

4. Protective structure for vehicles (10) as defined in claim 1, wherein said first impact energy absorption buffer (16) is made of materials which crush 50% under pressures of 0.1–0.6 N/mm².

5. Protective structure for vehicles (10) as defined in claim 2, wherein said external edge (21) of said cross member (17) protrudes forward with respect to at least one internal supporting surface of said first impact energy absorption buffer (16), said impact energy absorption buffer (16) having a total thickness at least 20% greater than said distance (D) between the external edge (21) of said cross member (17) and said external edge (20) of said bumper strip (12).

* * * * *